United States Patent [19]

Conigliaro et al.

[11] Patent Number: 4,689,603

[45] Date of Patent: Aug. 25, 1987

[54] VEHICLE IGNITION AND ALARM SYSTEM

[76] Inventors: Thomas S. Conigliaro; Samuel J. Conigliaro, both of 26 Theodore Rd., Huntington, Conn. 06484

[21] Appl. No.: 846,198

[22] Filed: Mar. 31, 1986

[51] Int. Cl.[4] .................. B60R 25/04; B60R 25/10
[52] U.S. Cl. .................................. 340/64; 340/576; 307/10 AT
[58] Field of Search ............ 340/64, 576, 63; 180/272, 287; 307/10 AT

[56] References Cited

U.S. PATENT DOCUMENTS

| | | | |
|---|---|---|---|
| 3,311,187 | 3/1967 | Haggard, Jr. ............... | 180/272 |
| 3,513,466 | 5/1970 | Isaacs et al. ................ | 340/63 |
| 3,646,515 | 2/1972 | Vodehnal .................... | 340/64 |
| 3,703,714 | 11/1972 | Andrews ..................... | 340/64 X |
| 3,824,538 | 7/1974 | Slemp ......................... | 340/576 X |
| 4,090,089 | 5/1978 | Morello et al. ............. | 340/64 X |
| 4,093,945 | 6/1978 | Collier et al. ............... | 340/576 X |
| 4,205,300 | 5/1980 | Ho et al. ..................... | 340/64 X |
| 4,262,279 | 4/1981 | Dublirer ...................... | 340/63 |
| 4,446,380 | 5/1984 | Mariya et al. ............... | 307/10 AT |
| 4,463,340 | 7/1984 | Adkins et al. ............... | 340/64 |

Primary Examiner—James L. Rowland
Assistant Examiner—Brian R. Tumm
Attorney, Agent, or Firm—Thomas L. Tully

[57] ABSTRACT

Digital code-controlled ignition and security system for a vehicle, including an alcohol-detector device for preventing ignition in presence of predetermined alcohol content in the breath of the operator. Apparatus includes digital module which is programmable to desired first ignition mode code and second security mode code. Ignition coil/distributor and starter solenoid/motor are deenergized in absence of proper ignition code, and starter solenoid/motor remains deenergized in absence of alcohol-detector approval. Alarm system is armed by security code, activated by any one of a plurality of detectors and cannot be deactivated until another code is entered into digital module. Remote transmitter/receiver is provided to activate alarm for testing or vehicle-location purposes, and to receive signal at remote location when alarm has been activated.

8 Claims, 3 Drawing Figures

VEHICLE IGNITION AND ALARM SYSTEM

BACKGROUND OF THE INVENTION

The present invention relates to an integrated ignition and alarm system for the protection of a motor vehicle against ignition by an unauthorized or intoxicated person and against tampering.

A number of different systems have been proposed either to prevent ignition of a motor vehicle by an intoxicated driver or to prevent tampering by an unauthorized person. However, no prior-known integrated system provides protection against both alcohol and tampering, or provides protection against either one of these problems in an acceptable and comprehensive manner.

For example, most vehicle security systems require the use of a key in an exterior switch in order to energize and/or deenergize the alarm mode, have no means for checking the operability of the system and cannot be activated or detected remotely from the vehicle. Also, most such security systems can be deactivated by an intruder from outside the vehicle because the exterior security switch provides evidence of the existence and location of the control wires, which can be bypassed.

Also, most alcohol-sensitive ignition systems can be bypassed, since the coil is energized by the ignition key and the alcohol sensor merely blocks the passage of current from the coil to the starter motor. When the wires are jumped to bypass the alcohol sensor, the vehicle can be started.

The prior known provision of protection against tampering and also against driving under the influence of alcohol requires two separate and independent electronic systems requiring separate installation, activation terminals and time-consuming procedures. More importantly, as noted, the prior security and alcohol-detection systems are unsatisfactory.

SUMMARY OF THE INVENTION

The novel system of the present invention comprises a keyless, integrated security/alcohol detection apparatus for a motor vehicle having an ignition coil and a starter motor, comprising a digital key pad which is associated with the ignition coil and also with an alcohol-sensitive relay controlling power to the starter motor of the vehicle, and also associated with a second relay controlling the power source and sensors for the alarm means, such as sirens, horn and/or lights on the vehicle. The key pad, conveniently mounted on the vehicle dashboard, is programmable during installation to coordinate any desired combination of key numbers or letters to the ignition mode and to the alarm mode of the system to provide code numbers which are known only to authorized persons. Thus, unauthorized persons cannot deactivate the siren or lights upon illegal entry to the vehicle, nor can they energize the ignition to start the vehicle without first entering the proper code on the key pad and then activating the alcohol-sensitive relay.

Moreover, the alcohol-sensitive relay of the ignition mode provides protection even against authorized persons with knowledge of the ignition code, if said persons are intoxicated or have a breath-alcohol content greater than that permitted by the relay, which is adjustable at the time of installation. Thus, the vehicle is protected even against the owner when an excess level of alcohol is present in the owner's breath. In such instances, the owner must permit a sober companion to start and operate the vehicle since there is no way to bypass the alcohol-sensitive relay and no way to start the vehicle without power to the starter motor.

Preferably, the present apparatus also includes a remote transmitter and/or a remote receiver, most preferably a combined device for both purposes. While the vehicle system is in the alarm mode, the owner is able to depress a button on the transmitter to activate the alarms, such as siren, horn and/or lights, for as a few seconds, if the system is in the "car locator" option, to establish that the alarms are operative and to assist with the location of the vehicle in a crowded parking lot, or to frighten away anyone who might be hiding nearby. If the system is in the "anti-tamper" option, the owner is able to press the button on the transmitter to activate the alarms until they are turned off by entering the proper code on the digital key pad. Also, the owner, with a remote receiver in his possession, is warned by the beeping noise emitted by the receiver whenever the alarms present in the vehicle have been activated. This permits the owner to call for assistance at the time of the unauthorized entry or tampering.

THE DRAWINGS

DETAILED DESCRIPTION OF THE DRAWING

Figure 1:
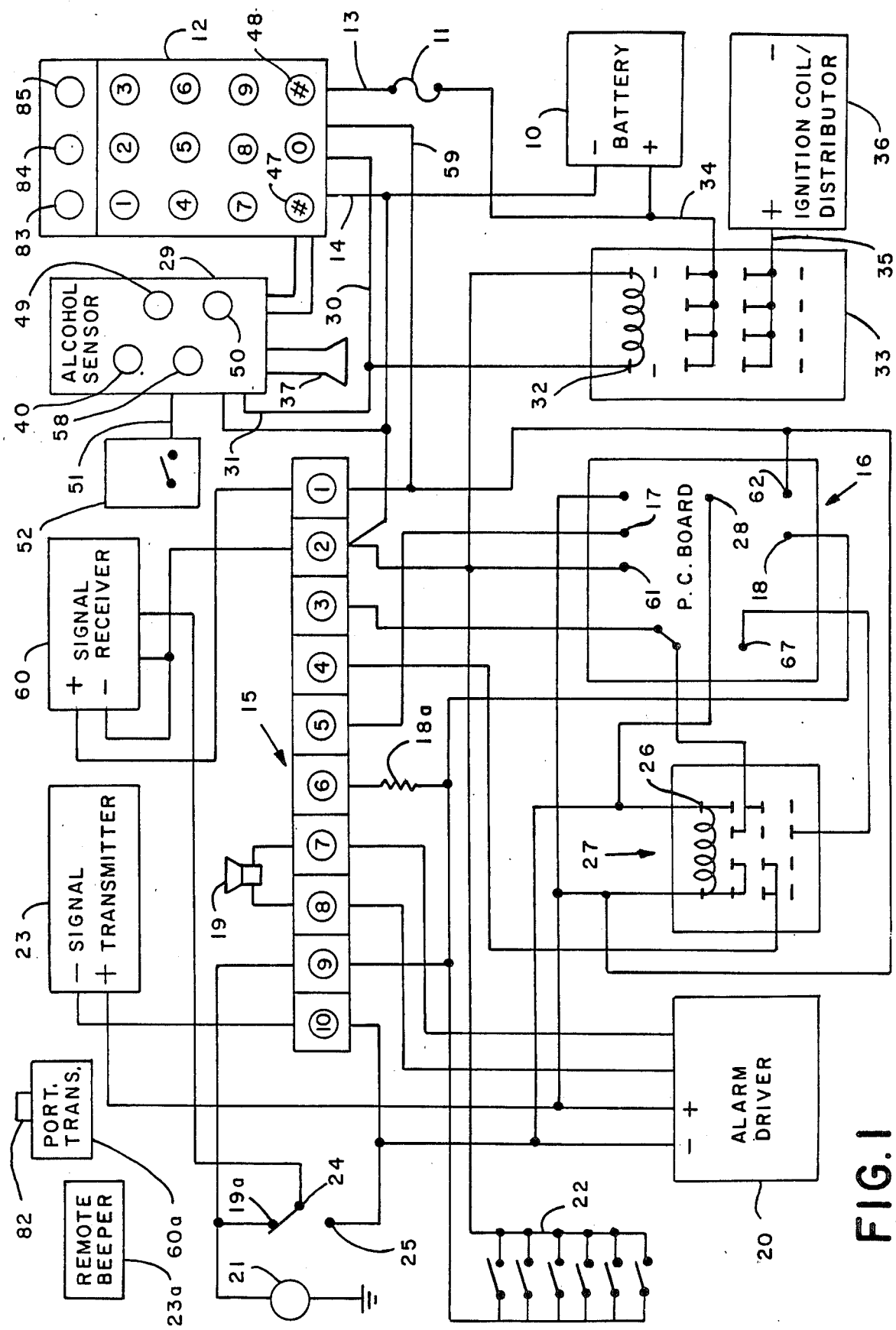
FIG. 1 is a wiring diagram of the system of the present invention showing the interrelationship of various components of the system.

Referring to the drawings, FIG. 1 illustrates the present system which includes a power source 10, such as a 12-volt car battery, a digital key pad 12, an alcohol sensor 29 connected to an ignition coil and distributor 36 through an ignition relay 33 and also connected to a starter solenoid and starter motor 52, to enable the ignition mode, the ignition relay 33 also being connected to an alarm relay 27, through a printed circuit board (PCB) 16 to enable the alarm mode.

As shown by FIG. 1, the power source 10 (+12 volt DC car battery) feeds power to a digital key pad 12 through wire 13 and fuse 11. To enable the alarm mode (anti-tamper option), the owner must first enter the proper alarm code on the digital key pad 12 and set toggle switch 24 to position 19a, such as when he parks and locks the vehicle. The alarm, once triggered by tampering with the car doors, hood, trunk antenna, etc., cannot be disabled unless the proper disabling code is entered on the digital key pad 12. The negative (−) side of the battery 10 is connected to key pad 12 by wire 14 to complete the circuit that will keep power applied to the digital key pad 12 when the latter is actuated by entry of the alarm code. Also the (−) negative side of the battery is connected to an eight-position terminal strip 15 at position 2 (negative) thereof. This point is also used as the common ground in the system. Position 3 (door) of terminal strip 15 is the point that connects to the entry door switch or switches (one or more may be used, connected in parallel). Position 3 will be "floating" until the driver's door is opened, at which time position 3 will be grounded via the door switch to activate the alarm after a time delay of several seconds. Position 4 (hazard lights) of terminal strip 15 is connected to the vehicle's "hazard lights" system so that when an alarm condition occurs, position 4 goes to +12 volt DC and activates the vehicle's emergency flasher system. Position 5 ("ANT") is connected to the printed circuit board 16 ("PCB") at terminal 17. This terminal 17 may be connected to the ground leg of a CB antenna or other car attachment. If the antenna is tampered with, the ground wire breaks and an alarm signal is immediately activated. If this feature is not going to be used, position 5 must be grounded to position 2. Position 6 ("trunk/hood/doors") of terminal strip 15 connects to normally open switches at the trunk, hood and passenger doors. When the trunk, hood or a passenger door opens, position 6 goes to ground potential and enters the "PCB" 16 at terminal 18. This also activates the alarm siren 19 immediately. Positions 7 and 8 of terminal strip 15 are the "siren" terminals and hook up to an 8 ohm horn/speaker 19 which is driven by an alarm driver 20. The terminals marked "siren" are the outputs. Position 9 of the terminal strip 15 connects to a "panic button" 21 which is normally open. When manual toggle switch 24 is set to position 25 (car locator option) and "panic button" 21, within the vehicle, is pushed, a ground is applied to the "PCB" 16 at terminal 18 which will also activate an immediate siren alarm. Position 9 of terminal strip 15 also connects to an array of level-sensing mercury switches 22. If any one of the normally open mercury switches 22 closes, due to the vehicle being lifted, tilted, jacked or towed, the siren alarm will be activated immediately. The six level-switching switches 22 will be positioned at various parts of the vehicle, with all switches being connected to "ground". Position 10 of terminal strip 15 is connected to a signal transmitter 23 at (−) (DC input), connected to the siren driver 20 at (−) (DC input), connected to car locator contact 25, and connected to the (−) coil terminal 26 of alarm relay 27 and to the PCB 16 at connection 28 which is an output signal from the PCB 16 and becomes ground potential when there is an alarm condition.

Figure 2:
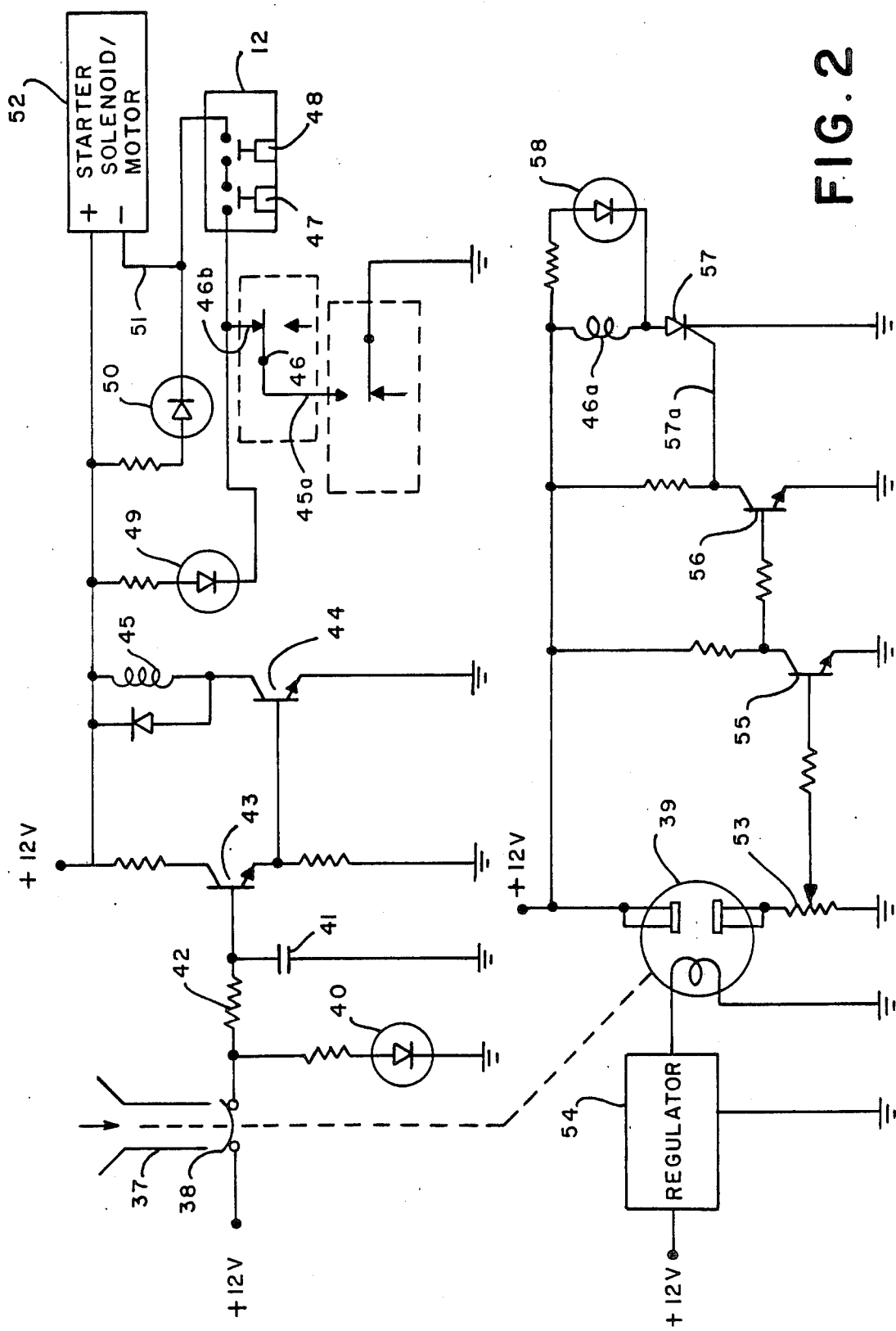
FIG. 2 is a schematic diagram showing the electronic makeup of a breath/control detector component of the present system.

FIG. 2 shows the schematic diagram of the circuitry of the alcohol sensor 29 of FIG. 1 and its association with key pad 12 and starter solenoid/motor 52. The purpose of this circuitry is to detect that a potential operator of the vehicle is blowing into the breath sampling tube 37, which can be located at center of steering wheel, and to determine if the breath being sampled has a low enough alcohol content to enable the starter solenoid/motor 52 to be powered. The operator must first enter the proper ignition key code combination into the key pad 12 of FIG. 1. For example, the key code may be 1-9-8-4. Entry of this code will apply power to the circuitry of alcohol sensor 29, but only if entry of the code is done correctly, i.e., each digit must be entered in the proper sequence and within a preset time interval such as four (4) seconds. When the correct entry of code is executed, lead 30 from the key pad 12, shown by FIG. 1, goes to +12 volts DC and enters the alcohol sensor 29 at lead 31. Also, the (+) coil terminal 32 of relay 33 (see FIG. 1) is fed +12 vDC which will energize relay 33 to connect the common contact 34 and the normally-open contact 35 to power the ignition coil/distributor 36 or ignition circuits of the vehicle. The ignition circuitry refers to the components of the engine which develop the spark plug voltage, including vehicle battery 10. Referring to FIG. 2, all points marked +12 v are tied together and connect to the alcohol sensor lead 31 of FIG. 1, entering the alcohol sensor 29. When a breath sample is being taken, the operator blows into the breath tube 37 and causes a normally open pressure sensitive switch 38 to close, while also exposing a gas sensor 39 to the breath to be sampled. As the breath is being blown into the breath tube 37, the switch 38 closes and an air-flow indicator 40 (amber LED) of sensor 29 lights to show that there is a sufficient amount of breath to be sampled. Also, capacitor 41 charges through resistor 42 after approximately 10 seconds and turns transistor 43 on, which drives transistor 44 on, which energizes relay coil 45. With coil 45 energized, the normally open (N.O.) contact 45a becomes ground and is applied to relay contact 46 (common). As long as this operator passes the breath test, relay coil 46a will remain deenergized allowing ground to enter the ignition buttons 47 and 48 through relay contact 46b. The operator then will see the "OK to start" green LED 49 ignite on sensor 29 and will press the ignition buttons 47 and 48 on either side of the "o" key on the digital key pad 12. Pressing both keys simultaneously will light the second green LED 50 "ignition starter" and will apply power through wire 51 to starter solenoid/motor 52 which will enable the engine to be started. The engine will start and the vehicle may be driven. If there is more than a preset maximum percentage of alcohol in the breath sampled, (resistor 53 is the calibration adjustment for the allowable percentage) current will be generated and will flow through the gas sensor 39 causing voltage to appear on resistor 53. Regulator 54 supplies +5 vDC to the heater element of sensor 39. When an excess of alcohol is detected by sensor 39, transistor 55 turns on which will shut off transistor 56. When transistor 56 shuts off, the gate 57a of silicon controlled rectifier 57 will go high and will turn on the rectifier 57, energizing relay coil 46a and igniting the "starter disabled" red LED 58 on sensor 29. When relay coil 46a is energized, the contacts 46 and 46b open and the starter solenoid cannot become energized so the engine will not start. To reset this "starter disabled" condition, the operator must enter the code number 1-9-8-4 into the key pad 12 which removes power to the alcohol detector 29 circuitry which resets (turns off) the rectifier 57. To try starting the vehicle again, the operator must reenter the code 1-9-8-4 which will reapply power to the alcohol detector 29 circuitry, and another breath sample must be taken and must pass the alcohol level test in order for the engine to be able to start.

Figure 3:
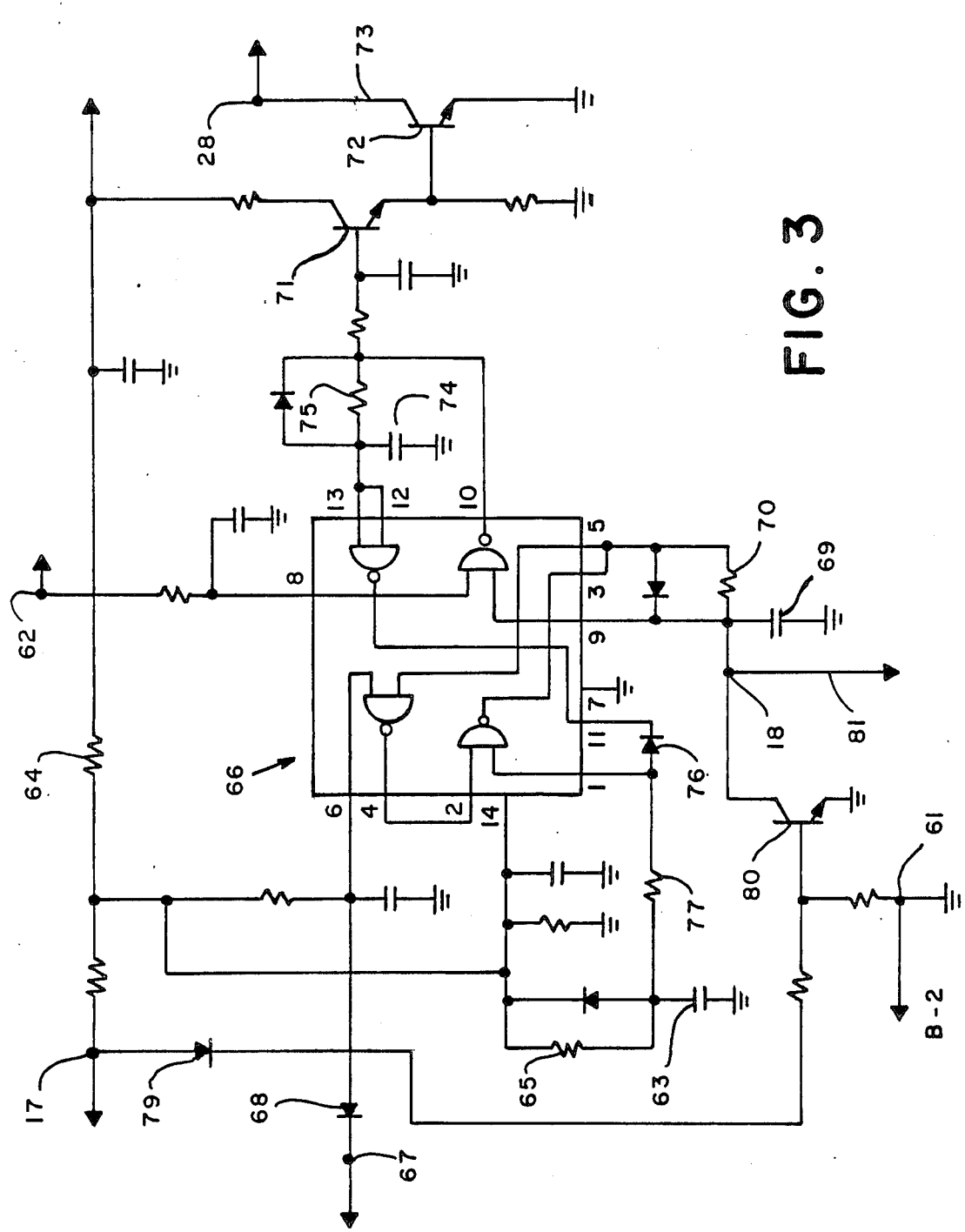
FIG. 3 is a schematic diagram of the P.C.B. (Printed Circuit Board) which contains most of the security alarm circuitry of the alarm component of the present system.

FIG. 3 shows the schematic diagram of the security circuitry of the present system. To enable the security circuitry, the operator must set the toggle switch 24 to contact 19a or 25 and enter a second code into the digital key pad 12. This second code is totally independent from the first code. The first code (1-9-8-4) only enables the alcohol sensor 29 and relay 33 of the ignition circuitry. The second or security code, such as 1-9-8-7 when entered properly, will feed +12 vDC to position (1) of the terminal strip 15 of FIG. 1 through lead 59. When position (1) is at +12 v, a signal receiver 60 on the vehicle and the PCB 16 are enabled. Power enters the PCB 16 at terminal 61 (−)DC and terminal 62 (+)DC inputs. The operator has approximately 20 seconds to exit the driver's door of the car after the security code has been entered on the key pad 12, which eliminates the need to have an external alarm key to turn the alarm circuitry on or off. This delay is due to the fact that capacitor 63 of the PCB 16 (FIG. 3) must charge up through resistors 64 and 65 which keeps the pin 1 of integrated circuit 66 low until capacitor 63 is charged, which takes approximately 20 seconds. In other words, for the first 20 seconds the car doors may be opened without sounding the siren alarm. After the 20-second charge time, pin 1 of integrated circuit 66 will be high and will allow an open door to sound the siren alarm. When the driver's door opens, a normally open door switch will send a ground to position (3) of terminal strip 15 which goes through relay 27 common and normally closed contacts (relay 27 is deenergized at this time) and enters the PCB 16 at contact 67. This ground signal will go through rectifier 68 (FIG. 3) and cause pin 6 of integrated circuit 66 to go low. When pin 6 is low, pins 4 and 2 become high and pins 3 and 5 go low which will start capacitor 69 discharging through resistor 70 which takes approximately 10 seconds and pin 9 will be low. When pin 9 goes low, pin 10 goes high, which will turn on transistor 71 which will turn on power transistor 72. When transistor 72 turns on, lead 73 becomes ground and will energize the alarm driver 20 to sound the siren 19 and will cause the transmission of a signal for 10 seconds from a built-in signal transmitter 23 to a remote battery-powered pocket beeper 23a which remains beeping until a reset button is pressed. This alerts the owner at a remote location that someone has entered the vehicle, and energizes relay 27 (FIG. 1) to send a +12 vDC signal to flash the hazard lights on the vehicle. The siren alarm will remain on for approximately 5 minutes until capacitor 74 (FIG. 3) charges through resistor 75 and causes pins 12 and 13 of integrated circuit 66 to become high. This causes pin 11 to go low which will go through rectifier 76 and discharge capacitor 63 through resistor 77. When capacitor 63 discharges, pin 1 becomes low and causes pins 3 and 5 to go high which charges capacitor 69 through resistor 70 which causes pin 9 to go high which causes pin 10 to become low which turns off transistors 71 and 72. When transistor 72 is off, PCB contact 28 will no longer be at ground potential and the siren alarm will stop. Connection 17 (FIG. 3) connects to terminal strip 15 (Position 5) which normally connects to a CB antenna's ground terminal. If the antenna is tampered with, this connection will become broken and send a high through rectifier 79 and turn on transistor 80. This causes pin 9 of integrated circuit 66 to become low and pin 10 to become high, which will send an alarm condition similar to the one discussed previously, except that this alarm will have no time delay. As soon as the antenna is removed and this wire breaks, the siren 19 will sound. The same thing happens if line 81 goes to ground. Terminal strip position 6 is normally connected to a normally open switch which closes, bringing ground to the PCB 16 via connection 18 and resistor 18a when the hood or trunk or a passenger door is opened. This, too, sets off an immediate alarm, whereas when the driver's door opens, the operator has approximately 10 seconds to enter the security code into the key pad 12 to turn off the alarm circuitry before the siren 19 starts to sound.

The battery-powered remote portable transmitter 60a of FIG. 1 can be used for the car locator option while the system is in the security mode. The security code must have been entered correctly to turn on the security mode, and the manual toggle switch 24 must have been set to contact 25 by the owner before leaving the car. When returning to the parking lot to find the car, the operator presses the transmit button 82 on the hand-held transmitter 60a. A LED on the hand-held transmitter 60a lights showing that a signal is being sent to receiver 60 (in FIG. 1). Upon receiving a signal from the hand-held transmitter 60a, the common contact of receiver 60, which is connected to ground, makes contact with the normally open (N/O) contact and a ground is sent through toggle switch 24 to driver 20 which turns on the siren 19. Also (FIG. 1) relay 27 becomes energized and flashes the hazard lights. The siren and hazard lights will remain on until the operator releases the push button 82 on the hand-held transmitter 60a. When switch 24 is set to contact 19a (anti-tamper option) transmitter 60a acts as a remote panic button. When pressed, a ground passes through 24 to the terminal strip 15 (Position 9) and immediately turns on the siren alarm and flashes the hazard lights. This alarm will reset itself in approximately 5 minutes. Panic button 21 (FIG. 1) generates the same alarm condition as previously described, except this panic button is located inside the car to provide an alarm for the driver if an emergency condition arises within the vehicle.

The digital key pad 12 is commercially available under the trademark "DIGITAL LOCK", model 1273, from Securtec, Inc., Scottsdale, Arizona. When amber LED 83 of digital key pad 12 is lit, the key pad 12 is ready for entry of code (to be selected by operator). This LED 83 should always be lit unless fuse 11 is open. To activate the breath test/ignition mode, the first code is entered on key pad 12 by the operator. This activates green LED light 84 to show that power is being delivered to the alcohol sensor 29 and to the ignition coil/distributor 36 but not to the starter solenoid/motor 52 of the vehicle. If the same code is reentered a second time, this LED 84 turns off and disables the alcohol sensor 29 and the ignition circuitry of the vehicle.

To activate the security mode, the second or security code is entered on key pad 12. The red LED 85 will go on showing that the alarm circuitry is on. The second entry of the security code will turn this red LED 85 off and disarm the alarm circuitry.

It will be apparent from the foregoing description that the novel integrated security ignition system of the present invention, while relatively simple to install and use, avoids a great many of the disadvantages of prior-known systems while incorporating features not possible with such prior-known systems, such as an integrated, interior, keyless, code-enabled digital key pad for both the security and ignition modes; lack of power to the ignition coil unless the proper key pad code is entered; inability to deactivate the security alarm unless the proper key pad code is entered; remote alarm detection and remote alarm activation, among other features.

Variations and modifications of the present invention will be apparent to those skilled in the art within the scope of the present claims.

We claim:

1. An integrated keyless ignition and alarm system for a motor vehicle having a battery-powered ignition circuit including an ignition coil/distributor and a starter solenoid/motor, and also having a battery-powered alarm circuit including an alarm-sounding means and tamper-sensing means, said integrated system comprising a battery, said ignition circuit comprising (a) a digital key pad having digital code-controlled means, connected to said battery and, in response to the first entry of a predetermined first digital code, to enable a (b) starter circuit comprising a breathing-force sensor and an alcohol-sensitive means which prevent the flow of power from said battery through said starter circuit in the absence of a satisfactory breathing force and in the presence of a breathing force containing excess alcohol, and (c) means connecting said starter circuit to the starter solenoid/motor of the vehicle, said digital key pad also comprising relay means responsive to the second entry of said predetermined first digital code for interrupting the connection of said battery to said starter circuit to disable said motor, said battery-powered alarm circuit comprising (d) said digital key pad connected to said battery and, in response to the first entry of a predetermined second digital code, to enable (e) tamper-sensing means associated with (f) alarm means, said digital key pad also comprising relay means responsive to the second entry of said predetermined second digital code for interrupting the connection of said battery to said alarm circuit to disable said tamper-sensing means and alarm means.

2. A system according to claim 1 which also includes a signal-receiver, associated with said alarm circuit and with a remote signal transmitter, which activates said alarm-sounding means when a signal is received from said remote signal transmitter.

3. A system according to claim 1 which also includes a signal-transmitter, associated with said alarm circuit, which is designed to transmit a remote signal to a remote signal receiver to activate said remote receiver to emit an audible signal when said alarm-sounding means is activated.

4. A system according to claim 1 which further includes manually-operative means for activating said alarm-sounding means from within the vehicle in an emergency situation.

5. A system according to claim 1 in which said starter circuit comprises a breathing tube to receive the breath of an operator said breathing-force sensor comprises a breathing force-sensitive switch, and said alcohol-sensitive means comprises a sensor which generates current in the presence of a predetermined alcohol percentage in the breath being sampled to disable said starter circuit.

6. A system according to claim 5 in which said starter circuit comprises indicator lights which are activated when the first digital code is properly entered, and when a satisfactory breathing force has been applied, and when the alcohol-sensitive means is activated, to disable the starter circuit and block power to the starter solenoid/motor, and when the alcohol-sensitive means enables the starter circuit to supply power to the starter solenoid/motor.

7. A system according to claim 1 in which said digital key pad comprises indicator lights which are activated when the proper first digital code has been entered, to enable the alcohol-sensitive circuit, and when the proper second digital code has been entered, to enable the alarm circuit.

8. A system according to claim 1 which comprises delay means, associated with at least said tamper-sensing means associated with the driver's door of the vehicle, for disabling the alarm circuit until said door has been open for a brief predetermined time period.

* * * * *